US000001502H

United States Statutory Invention Registration [19]

[11] Reg. Number: H1502

Allan et al.

[45] Published: Nov. 7, 1995

[54] MELTBLOWN FIBERS AND WEBS PRODUCED FROM LIQUID CRYSTAL POLYMERS

[75] Inventors: John L. Allan, Simpsonville, S.C.; Leon Katz, Stamford, Conn.; Jeffery J. Boettcher, Appleton, Wis.

[73] Assignee: Fiberweb North America, Inc., Simpsonville, S.C.

[21] Appl. No.: 108,057

[22] Filed: Aug. 17, 1993

[51] Int. Cl.[6] ..... D04H 11/00

[52] U.S. Cl. ..... 428/224

[58] Field of Search ..... 428/224

[56] References Cited

U.S. PATENT DOCUMENTS

| | | |
|---|---|---|
| 3,972,759 | 8/1976 | Buntin . |
| 3,975,487 | 8/1976 | Cottis et al. . |
| 4,332,759 | 6/1982 | Ide . |
| 4,370,466 | 1/1983 | Siemionko . |
| 4,398,018 | 8/1983 | Akkapeddi et al. . |
| 4,458,039 | 7/1984 | Eickman . |
| 4,479,999 | 10/1984 | Buckley et al. . |
| 4,503,005 | 3/1985 | Ueno et al. . |
| 4,540,737 | 9/1985 | Wissbrun et al. . |
| 4,553,815 | 11/1985 | Martin . |
| 4,581,399 | 4/1986 | Yoon . |
| 4,600,765 | 7/1986 | Lee et al. . |
| 4,614,791 | 9/1986 | Hutchings et al. . |
| 4,654,412 | 3/1987 | Calundann et al. . |
| 4,699,746 | 10/1987 | Zimmerman . |
| 4,728,698 | 3/1988 | Isayev et al. . |
| 4,767,183 | 8/1988 | Martin . |
| 4,772,089 | 9/1988 | Ide et al. . |
| 4,791,187 | 12/1988 | Siiling et al. . |
| 4,810,834 | 3/1989 | Grogl et al. . |
| 4,828,775 | 5/1989 | Willenberg . |

FOREIGN PATENT DOCUMENTS

| | | |
|---|---|---|
| 91253 | 10/1983 | European Pat. Off. . |
| 166830 | 1/1986 | European Pat. Off. . |
| 0351318 | 1/1990 | European Pat. Off. . |

*Primary Examiner*—Donald P. Walsh
*Assistant Examiner*—Chrisman D. Carroll
*Attorney, Agent, or Firm*—Bell, Seltzer, Park & Gibson

[57] ABSTRACT

This invention relates to a novel microfiber, to a nonwoven web comprising said microfiber, and to a method of preparing said web. The meltblown microfibers have a diameter of less than 150 micrometers. The microfibers are prepared by meltblowing a liquid crystal polymer such as a wholly aromatic polyester amide of p, p' biphenol, p-hydroxybenzoic acid and terephthalic acid or a wholly aromatic polyester amide of 2-hydroxynaphthoic acid, p-aminophenol and terephthalic acid.

18 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MELTBLOWN FIBERS AND WEBS PRODUCED FROM LIQUID CRYSTAL POLYMERS

BACKGROUND OF THE INVENTION

This invention relates to a novel microfiber, to a nonwoven web comprising said microfiber, and to a method of preparing said web. More particularly, this invention relates to a microfiber which is prepared by meltblowing a liquid crystal polymer.

The technique of meltblowing is well known in the art and involves extruding a molten polymeric material into fine streams and attenuating the streams into very fine fibers by impinging a high velocity heated gas against the molten polymer that exits the extrusion die. The high velocity gas, usually air, may be maintained at an elevated temperature and serves to attenuate the molten resin to form fibers or, depending upon the degree of attenuation, microfibers having diameters less than the diameter of the capillaries of the die. As used herein, the term microfibers refers to fibers having a diameter of less than 150 μm. The die melt temperature, i.e., the temperature of the polymer melt at the die, is generally about 80°–100° C. above the melting temperature of the resin. Meltblowing processes are described for example in Buntin et al. U.S. Pat. No. 3,978,185; Buntin U.S. Pat. No. 3,972,759; and McAmish et al. U.S. Pat. No. 4,622,259. These patent disclosures are hereby incorporated by reference.

The meltblowing process has been most commonly used for the meltblowing of polyolefins, such as polypropylene. Nonwoven webs made from polypropylene microfibers are soft and drapable and have been used as meltblown webs or as components in composite nonwoven fabrics. As is reported in Tappi, *The Journal of the Technical Association of the Pulp and Paper Industry*, Vol. 56, pages 74–77 (April 1973), other polymers which have been meltblown successfully include polyethylene, nylons, polyesters such as polyethylene terephthalate and poly(tetramethylene terephthalate). Various elastomeric polymers have also been meltblown to form nonwoven webs.

A class of high performance polymers has been developed which exhibit relatively high thermal stability, a high degree of resistance to chemicals and radiation, and relatively high tensile strength and which are based upon liquid crystal thermoplastic polymers. A particular class of such polymers which has received considerable recent interest are liquid crystal polyester polymers. These liquid crystal polyester polymers have been used as molding resins for high temperature stable products, in films, and to form fibers of conventional textile sizes by melt spinning. For example, U.S. Pat. No. 3,975,487 describes a process for spinning high modulus fibers from a liquid crystalline copolyester by meltspinning. Also, the formation of liquid crystalline (optically anisotropic) meltspun polyester fibers is disclosed in U.S. Pat. Nos. 4,370,466; 4,503,005 and 4,699,746. Published European Application EP 166,830 also describes the formation of fibers and webs from meltspun optically anisotropic polyester polymers.

SUMMARY OF THE INVENTION

The present invention is based upon the use of liquid crystal thermoplastic polymers in a meltblowing process to form microfibers and meltblown microfibrous webs having a number of unique and advantageous properties. Meltblown microfibers and microfibrous webs in accordance with the invention exhibit excellent strength and tensile characteristics, as well as other advantageous properties.

The novel meltblown microfibrous webs in accordance with the present invention are useful in a variety of special applications where extreme conditions prevail. For example, the webs are useful as liquid filters for high temperature filtration of solvents, strong acids or bases, as battery separators, and as air or gas filters for hot or corrosive gases. Also, the webs may be used as insulation. The high abrasion resistance of the webs combined with low surface friction makes them useful as packings for glands or shafts in extreme environments. The webs are also useful as components in laminates for high temperature applications where they will provide a distortion resistant reinforcement for other component layers and improved tensile strength and modulus. The meltblown microfibers can be used for the reinforcement of molded articles based on conventional thermoplastic molding compounds such as polyesters, nylons, acetals and the like.

Thus, the present invention provides a nonwoven web formed of meltblown microfibers consisting essentially of a liquid crystalline polyester polymer. The meltblown microfibers in accordance with a preferred aspect of the invention have a fiber diameter of less than 20 micrometers. Meltblown microfibers and microfibrous webs of this very small fiber diameter have particularly advantageous tensile strength and modulus properties, and have a very large surface area to mass ratio which makes them particularly useful for fiber reinforcement of plastics. The present invention, in still another aspect provides a process for preparing a nonwoven microfibrous web comprising meltblowing a liquid crystalline polyester.

BRIEF DESCRIPTION OF THE DRAWINGS

Some of the features and advantages of the invention having been described, others will become apparent from the detailed description which follows, and from the accompanying drawings, in which.

DETAILED DESCRIPTION OF THE INVENTION

Figure 1:
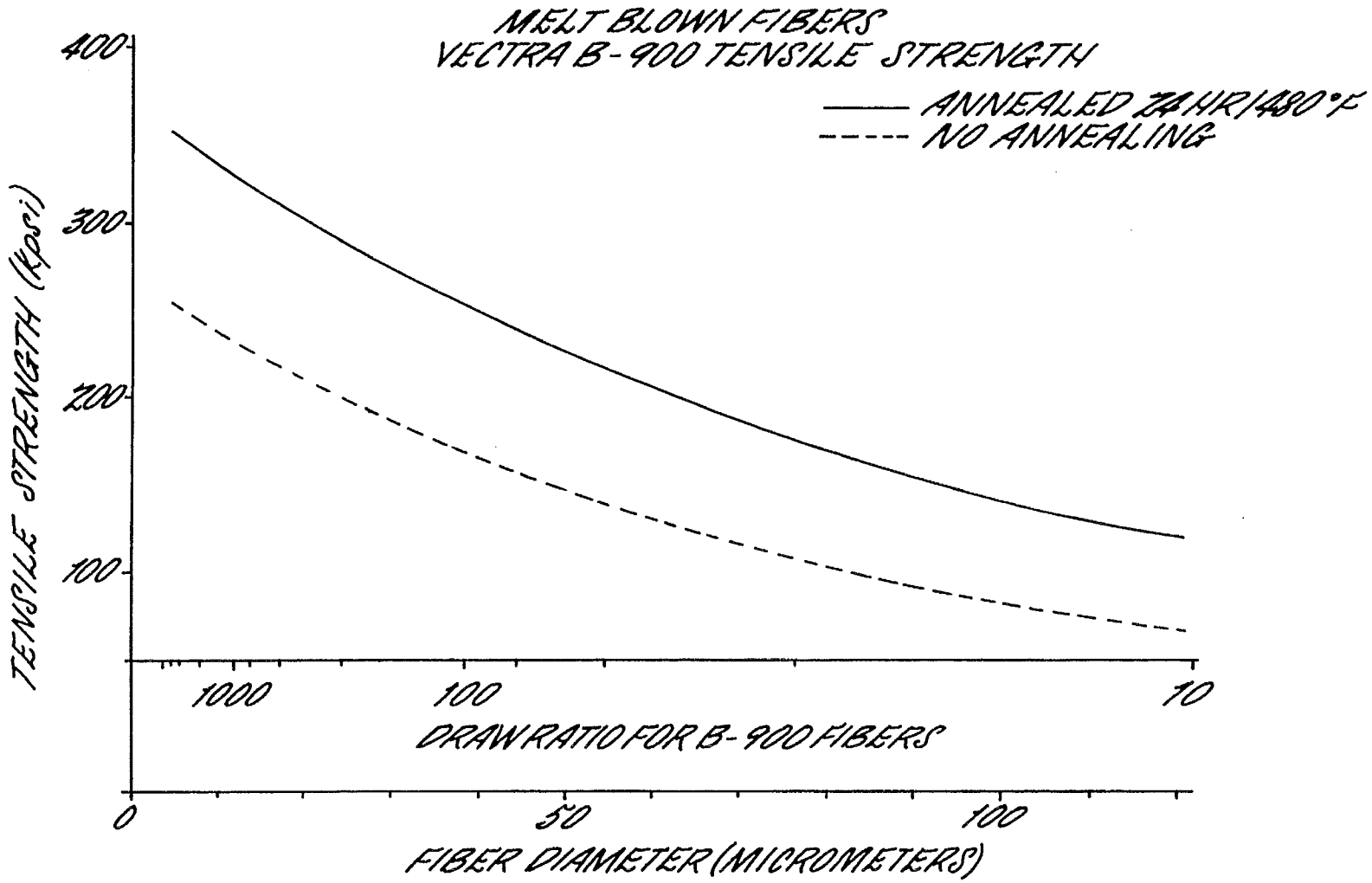
FIG. 1 is a graph showing the relationship of fiber diameter and draw ratio to tensile strength for metlblown microfibers of liquid crystalline polyester polymer in accordance with the invention.

The polymers which are useful in the present invention are liquid crystal thermoplastic polyesters. More particularly, meltblown microfibers and webs in accordance with the present invention are produced from polyester polymers which exhibit liquid crystalline or anisotropic order in the melt phase, and are referred to as being "thermotropic". The presence of thermotropic properties can be confirmed by conventional polarized light techniques using cross polarizers. Thermotropic liquid crystal polyesters include, but are not limited to, wholly aromatic polyesters, aromatic-aliphatic polyesters, aromatic polyazomethines, aromatic polyester-carbonates and aromatic polyester-amides.

In a more specific aspect, the present invention employs essentially wholly aromatic polyester polymers. To be considered wholly aromatic, each monomer must contribute at least one aromatic ring to the polymeric backbone. This structure in part gives the polymer thermotropic properties.

One such commercially available liquid crystal polyester is a wholly aromatic polyester sold by Amoco Performance Plastics under the registered trademark XYDAR® and consists essentially of p, p' biphenol, p-hydroxybenzoic acid, and terephthalic acid monomers. XYDAR® resin is commercially available in various grades, and is available either in pure form or combined with certain fillers.

Other commercially available liquid crystal thermoplastic polyesters include VECTRA®, a registered trademark of Hoechst-Celanese, which is a wholly aromatic polyester amide of 2-hydroxynaphthoic acid, p-aminophenol and terephthalic acid.

According to the present invention, the liquid crystal polymer composition is meltblown to produce a nonwoven microfibrous web. Meltblowing involves extruding a molten polymeric material into fine streams and attenuating the streams to fine fibers by flows of high velocity heated air that also break the streams into discontinuous microfibers.

The die melt temperature, i.e., the temperature of the polymer melt at the die, is generally about 80°–100° C. above the melting temperature of the resin. Preferably, however, the die melt temperature can be more than about 100° C. above the melting temperature of the composition. In an especially preferred embodiment, the present composition is meltblown at a temperature greater than about 300° C. In a still more preferred embodiment, the composition is meltblown at a temperature of from about 350° C. to about 375° C.

The technique of meltblowing is known in the art and is discussed in various patents, e.g., Buntin et al., U.S. Pat. No. 3,978,185; Buntin, U.S. Pat. No. 3,972,759; and McAmish et al., U.S. Pat. No. 4,622,259, the disclosures of which are hereby incorporated by reference. Although one or more of these patents, e.g., Buntin, U.S. Pat. No. 3,972,759, states that a polymer degradation step is required before meltblowing to ensure that the polymer resin has the requisite viscosity, a polymer degradation step is optional in the present invention. This is because we have found that the liquid crystal polymer compositions used in the present invention generally have the requisite viscosity for the production of high quality nonwoven webs without a polymer degradation step. Specifically, liquid crystal polyester polymers used in the present invention typically have an apparent viscosity of about 1000 poise, measured at a shear rate of about 1000 $sec^{-1}$ and a temperature of 375° C.

In accordance with this invention, commercially useful resin throughput rates can be utilized. Suitable resin throughput (flow) rates range from nominally about 0.1 (e.g., as low as about 0.07) to about 5 grams per minute per nozzle orifice.

In the meltblowing process of the present invention, the composition is attenuated while still molten to fibers having diameters of 0.5 to 150 micrometers (microns). Microfibers with a diameter of 25 micrometers or less are particularly preferred. The diameter of the attenuated fibers generally decreases as the gas flow rate increases through the gas outlets or slots on either side of the nozzle die openings. At high gas rates, the fiber diameter is generally between about 0.5 and 5 microns.

Subsequent collection of the fibers on a screen, belt, drum, or the like yields a mat of the fibers. Meltblown microfibrous webs according to the present invention can be point-bonded for added mechanical strength, or they can be laminated with other webs to obtain structures with multiple functions.

For example, the nonwoven webs of the present invention can be bonded by a point application of heat and pressure using patterned bonding rollers. At these points where heat and pressure is applied, the fibers fuse together, resulting in strengthening of the web structure. Also, Minto et al., U.S. Pat. No. 4,469,734, discloses a method to prepare wipes from a meltblown web, the web being formed or provided with apertures by, for example, hot needling or by passing the web between differentially speeded rolls. The disclosure of Minto et al., U.S. Pat. No. 4,469,734, is hereby incorporated by reference.

The novel meltblown microfibrous webs in accordance with the present invention are useful in a variety of special applications where extreme conditions prevail. For example, the webs are useful as liquid filters for high temperature filtration of solvents, strong acids or bases, as battery separators, and as air or gas filters for hot or corrosive gases. Also, the webs may be used as insulation. The high abrasion resistance of the product combined with low surface friction makes them useful as packings for glands or shafts in extreme environments. The webs are also useful as components in laminates for high temperature applications where they will provide a distortion resistant reinforcement for other component layers. Meltblown nonwoven microfibrous webs formed of the liquid crystal polyesters can be used in the reinforcement of thermosetting compositions based, for example, on epoxides, and as filters or insulation for use in hostile environments, especially where high temperature resistance, non-flammability, and resistance to chemicals and radiation are important. Furthermore, they may be used as filters for the removal of particulate matter or water, or as filters for removing acidic or basic materials. In addition, they may be used in odor removers, in battery separators, and in barrier composites. Another use is in making nonwoven fabric laminates, for example by hydroentanglement. The meltblown microfibers, separate and apart from a nonwoven web, can be used for the reinforcement of molded articles based on conventional thermoplastic molding compounds such as polyesters, nylons, acetals and the like.

Moreover, the present meltblown materials are useful as reinforcing agents for plastics, adhesives, concrete, and the like, and in geotextile applications. Also, they can be conductive or may be made conductive by the inclusion of conductive materials or by metal plating, and may then be used in EMI shielding or microwave-interactive heating constructions. In short, the present meltblown materials may be used for just about anything that conventional nonwoven webs can be used for.

The following examples illustrate the present process for preparing a nonwoven web and the properties thereof.

EXAMPLE 1

Pelletized XYDAR resin, a thermotropic polyester similar to those disclosed in U.S. Pat. No. 3,975,487 and supplied by Amoco Performance Plastics was meltblown using a method similar to that disclosed in U.S. Pat. No. 3,972,759. A temperature of the melt in the die ranged from 660°–670° F. (350°–355° C.) and the throughput was 1.13–1.41 g/spinneret hole/min. By varying other process conditions, both individual discrete microfibers and a continuous microfibrous web were formed.

The microfibers ranged in diameter down to two micrometers and were seen to be highly crystalline when viewed under a microscope with polarized light. The tensile strength and modulus of the fibers was measured and the results are shown in Table 1. As seen from Table 1, the tenacities were high and in general increased with decreasing fiber diameter. The tenacities could be improved significantly by annealing at elevated temperatures. The fibers were also seen to be non-burning.

TABLE 1

XYDAR FIBERS
TENSILE STRENGTH AND MODULUS

| Fiber Diam. (μm) | Draw Ratio | Tensile Properties Strength ($lb/in^2$) | Mod. ($10^6$ $lb/in^2$) | Elong. (%) |
|---|---|---|---|---|
| 150 | 6.0 | 63,400 | 2.06 | 3.1 |
| 122 | 9.1 | 75,300 | 2.74 | 2.8 |
| 117 | 9.9 | 97,900 | 2.99 | 3.3 |
| 103 | 12.8 | 46,400 | 3.10 | 1.5 |
| 91 | 16.4 | 102,000 | 3.10 | 3.3 |
| 75 | 24.1 | 112,100 | 4.79 | 2.3 |
| 72 | 26.2 | 140,700 | 5.91 | 2.6 |
| 69 | 28.5 | 73,900 | 2.61 | 2.9 |
| 65 | 32.1 | 89,600 | 4.14 | 2.2 |
| 59 | 39.0 | 85,200 | 3.73 | 2.1 |
| 55 | 44.8 | 92,100 | 3.61 | 2.4 |
| 42 | 76.9 | 87,700 | 9.30 | 7.5 |

Notes:
1. Draw ratio is the calculated ratio of the length of the extruded fiber to the length of the attenuated fiber excluding any die swell and subsequent shrinkage.
2. Tensile properties were measured on single fibers bonded between pieces of board at each end and separated by one inch using an Instron, Model 1101. The jaw spacing was one inch and the speed was one inch per minute. Fiber diameters were measured under a microscope.
3. Tensile strengths of the smallest diameter fibers do not appear to increase, probably because of faults in the individual fibers.

The physical properties of the nonwoven web were measured and are set forth in Table 2. The fiber diameters ranged down to as small as 2 micrometers. Properties could be improved by annealing at elevated temperatures. The webs are non-flammable.

TABLE 2

PHYSICAL PROPERTIES OF XYDAR WEBS

| Basis Weight ($g/m^2$) | Caliper (mils) | Gurley Permeability (scfm) | Pore Number (inches of water) | Tensile Strength ($lb/in.^2$) MD | Tensile Strength ($lb/in.^2$) CD |
|---|---|---|---|---|---|
| 440 | 206 | >350 | 2.0 | >180 | >158 |

Unless otherwise stated, the following test methods were used in the Examples.

Basis Weight: Samples were cut using a razor blade and a metal template (50×200 millimeters) and the sample weighed to the nearest 0.001 gram. The specimens wee dried and equilibrated to ambient conditions before weighing. The basis weight is reported, in grams per square meter ($g/m^2$), as the weight of the sample×100.

Caliper: Web thickness was measured using an Ames gauge (Model 79-100; Ames Inc., Waltham, Mass.) with zero load.

Gurley Permeability: Permeability was measured using a gurley Permeometer (Model 4301; Teledyne Gurley, Troy, N.Y.) for a two-inch-diameter disc of the web with an air pressure of 0.5 inch of water.

Pore Number: The pore number was measured as the minimum air pressure, in inches of water, necessary to force a bubble of air through a 0.75 inch diameter disc of web supporting a column of isopropanol 1.375 inches high. The equipment used is similar to the simplified set-up described in ASTM F316-80. The maximum pore size was calculated using the method of ASTM F316-80.

Tensile Measurements: Tensile strength (maximum strength) was measured using an Instron tensile tester (Model 1101; Instron Corp., Canton, Mass.) and the following conditions: Sample Width 1.0 inch 2.; Jaw Size 1.0 in.

EXAMPLE 2

Vectra B-900 (Celanese Corporation, Summit, N.J.) polymer, a liquid crystal polymer which is a wholly aromatic polyester amide of 2-hydroxynaphthoic acid, p-aminophenol and terephthalic acid, was meltblown by the method disclosed in U.S. Pat. No. 3,972,759. The temperature of the melt in the die was 805° F., and the primary air temperature averaged 595° F. at flows of about 11 scfm/inch of spinneret. Fibers were collected on a moving wire, and tensile properties were measured as in Example 1. The results in Table 3 show that high tensile fibers were obtained whose strength and modulus increased with increasing draw ratio.

TABLE 3

TENSILE DATA ON MELTBLOWN VECTRA B-900 FIBERS

| Fiber diam. (μm) | Draw Ratio | Tensile Strength (kpsi) | Tensile Modulus (Mpsi) |
|---|---|---|---|
| 132 | 7.7 | 81 | 10.0 |
| 127 | 8.4 | 88 | 9.1 |
| 109 | 11.4 | 82 | 15.0 |
| 102 | 13.0 | 111 | 12.8 |
| 81 | 20.6 | 115 | 10.2 |
| 81 | 20.6 | 114 | 15.0 |
| 76 | 23.4 | 153 | 16.4 |
| 64 | 33.0 | 155 | 23.6 |

EXAMPLE 3

Figure 2:
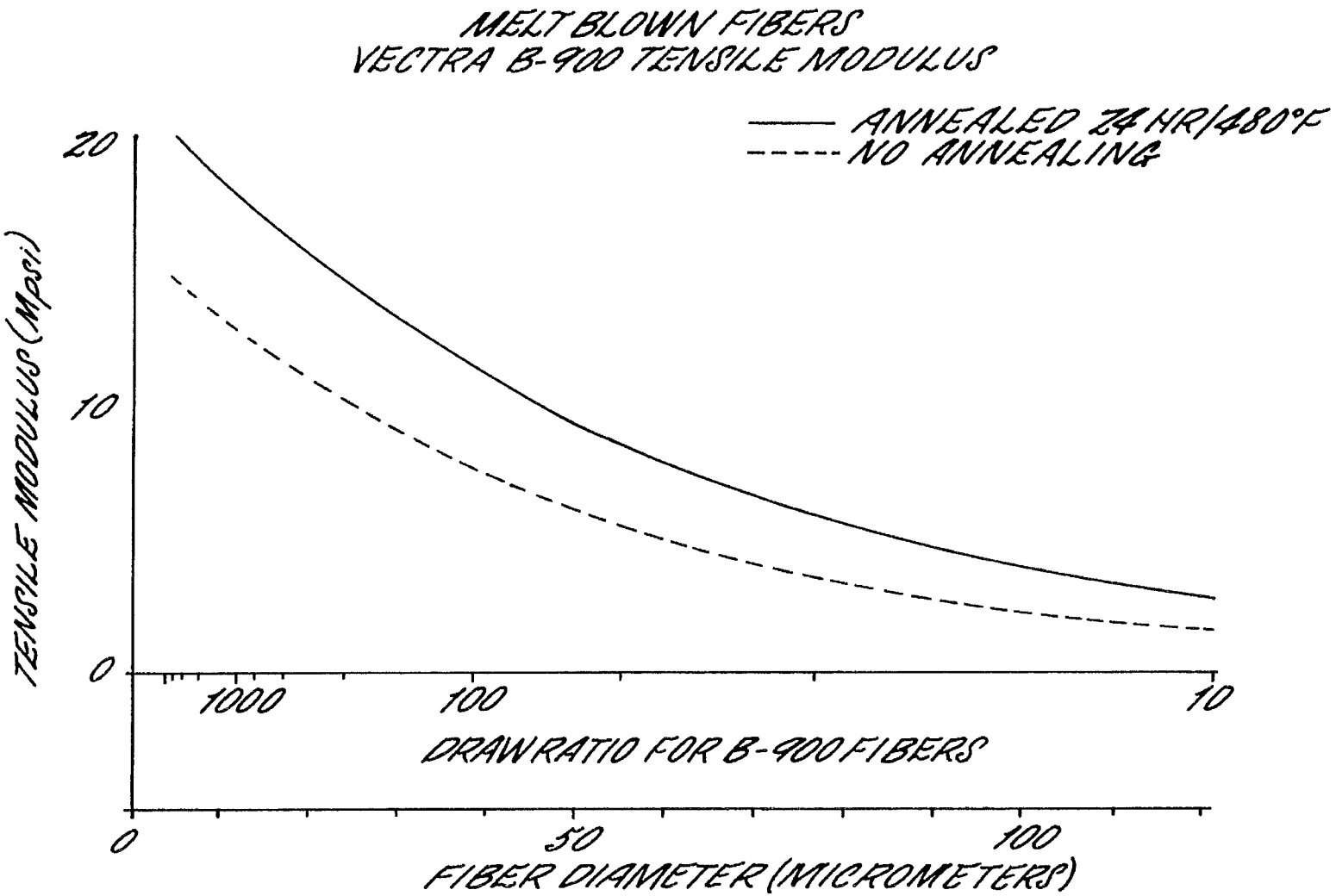
FIG. 2 is a graph showing the relationship of fiber diameter and draw ratio to tensile modulus for metlblown microfibers of liquid crystalline polyester polymer in accordance with the invention.

Example 2 was repeated at melt temperatures of 610°–700° F., but with primary air temperatures ranging up to 680° F. and increased flow rates up to 18 scfm/inch of spinneret length to obtain fibers with diameters ranging from 5 to 120 μm in diameter. The tensile strength and tensile modulus was measured as before on a large number of fibers as produced and after annealing for 24 hours at 480° F. in air. The results after subjecting the data to analysis are shown graphically in FIGS. 1 and 2 and show a marked increase in fiber strength and modulus with increasing attenuation or draw ratio and after annealing, especially for fiber diameters of about 20 μm and below. Differential scanning calorimetry analyses were run on different lots of the fibers having different ranges of diameters. The results in Table 4 show a marked increase in peak endotherm resulting from increased crystallinity with annealing.

TABLE 4

DSC DATA ON MELTBLOWN VECTRA B-900 FIBERS

| Fiber Diameter Range (μm) | Annealing Conditions | Peak Temperature (°C.) | Enthalpy (cal/g) |
|---|---|---|---|
| 80–120 | None | 281 | 0.1 |
| 80–120 | 24 hr/480° F. | 304 | 1.6 |
| 25–50 | None | 280 | 0.2 |
| 25–50 | 24 hr/480° F. | 289 | 1.4 |

TABLE 4-continued

| DSC DATA ON MELTBLOWN VECTRA B-900 FIBERS | | | |
|---|---|---|---|
| Fiber Diameter Range (μm) | Annealing Conditions | Peak Temperature (°C.) | Enthalpy (cal/g) |
| 5–15 | None | 280 | 0.1 |
| 5–15 | 24 hr/480° F. | 299 | 1.3 |

That which is claimed is:

1. A nonwoven web formed of meltblown microfibers consisting essentially of a liquid crystalline polyester polymer which comprises a wholly aromatic polyester amide wherein the polyester moieties are derived from p, p' biphenol, p-hydroxybenzoic acid and terephthalic acid.

2. A nonwoven web according to claim 1 wherein said meltblown microfibers have a diameter of less than 150 micrometers.

3. A nonwoven web according to claim 1 wherein said meltblown microfibers have a diameter of less than 20 micrometers.

4. A nonwoven web according to claim 1 wherein said meltblown microfibers are in the annealed state.

5. A nonwoven web formed of meltblown microfibers consisting essentially of a liquid crystalline polyester polymer which comprises a wholly aromatic polyester amide of 2-hydroxynaphthoic acid, p-aminophenol and terephthalic acid.

6. A nonwoven web according to claim 1 including a multiplicity of discrete point bonds in which the fibers of the web are fused and bonded together.

7. Meltblown microfibers formed of a liquid crystalline polyester polymer which comprises a wholly aromatic polyester amide wherein the polyester moieties are derived from p, p' biphenol, p-hydroxybenzoic acid and terephthalic acid.

8. Meltblown microfibers according to claim 7 wherein said microfibers are of a diameter of less than 150 micrometers.

9. Meltblown microfibers according to claim 7 wherein said microfibers are of a diameter of less than 20 micrometers.

10. Meltblown microfibers according to claim 7 in which said microfibers are in the annealed state.

11. Meltblown microfibers formed of a liquid crystalline polyester polymer which comprises a wholly aromatic polyester amide of 2-hydroxynaphthoic acid, p-aminophenol and terephthalic acid.

12. A filter comprising the meltblown nonwoven web of claim 1.

13. A battery separator comprising the meltblown nonwoven web of claim 1.

14. A packing for glands or shafts comprising the meltblown nonwoven web of claim 1.

15. A high temperature laminate comprising the meltblown nonwoven web of claim 1 laminated to at least one other component layer.

16. A reinforced molded article comprising a molding resin having reinforcing fibers according to claim 7 dispersed therein.

17. A reinforced molded article according to claim 16 wherein the molding resin is a thermoplastic resin selected from the group consisting of polyesters, nylons, and acetals.

18. A reinforced molded article according to claim 16 wherein the molding resin is a thermosetting composition selected from the group consisting of epoxides, phenolics and amino-resins.

* * * * *